United States Patent [19]

Mita et al.

[11] Patent Number: 5,278,868
[45] Date of Patent: Jan. 11, 1994

[54] RECEIVER FOR QUADRAPHASE MODULATION SIGNALS

[75] Inventors: Seiichi Mita, Kanagawa, Japan; Johannes W. M. Bergmans, Eindhoven, Netherlands

[73] Assignees: U.S. Philips Corporation, New York, N.Y.; Hatachi, Ltd., Tokyo, Japan

[21] Appl. No.: 613,816
[22] PCT Filed: May 7, 1990
[86] PCT No.: PCT/NL90/00064
    § 371 Date: Jan. 8, 1991
    § 102(e) Date: Jan. 8, 1991
[87] PCT Pub. No.: WO90/13958
    PCT Pub. Date: Nov. 15, 1990

[30] Foreign Application Priority Data

May 8, 1989 [JP] Japan ............................ 01-113712

[51] Int. Cl.$^5$ .................................... H03H 7/30
[52] U.S. Cl. ............................. 375/15; 375/39; 364/724.2
[58] Field of Search .............. 375/12, 14, 15, 18, 375/39, 83, 86; 333/18, 28; 364/724.2

[56] References Cited

U.S. PATENT DOCUMENTS

| 3,400,332 | 9/1968 | O'Neill, Jr. et al. | 375/15 |
| 3,508,153 | 4/1970 | Gerrish et al. | 375/18 |
| 3,781,873 | 12/1973 | Nussbaumer | 375/18 |
| 3,906,347 | 9/1975 | Motley et al. | 375/15 |
| 3,947,768 | 3/1976 | Motley et al. | 333/18 |
| 4,061,978 | 12/1977 | Motley et al. | 333/18 |
| 4,224,575 | 9/1980 | Mosley et al. | 375/83 |
| 4,237,554 | 12/1980 | Gitlin et al. | 375/15 |
| 4,355,397 | 10/1982 | Stuart | 375/17 |
| 4,571,734 | 2/1986 | Dolivo et al. | 375/102 |
| 4,745,623 | 5/1988 | Sebald et al. | 375/724.2 |
| 5,025,455 | 6/1991 | Nguyen | 375/86 |

FOREIGN PATENT DOCUMENTS

WO8603356 6/1986 United Kingdom.

*Primary Examiner*—Stephen Chin
*Attorney, Agent, or Firm*—Edward W. Goodman

[57] ABSTRACT

In a receiver of quadraphase modulation signals, a receiver of quadraphase modulation signals which is provided with two kinds of equalizers being different in each sine and cosine phases, together with an equalizer extracting a clock signal.

13 Claims, 7 Drawing Sheets

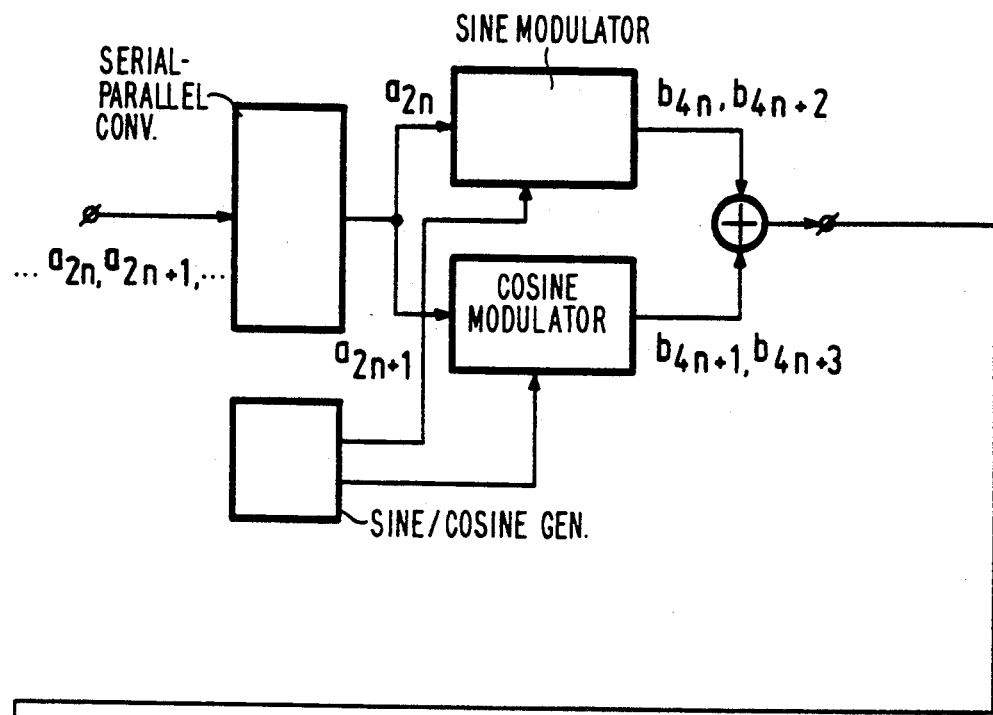
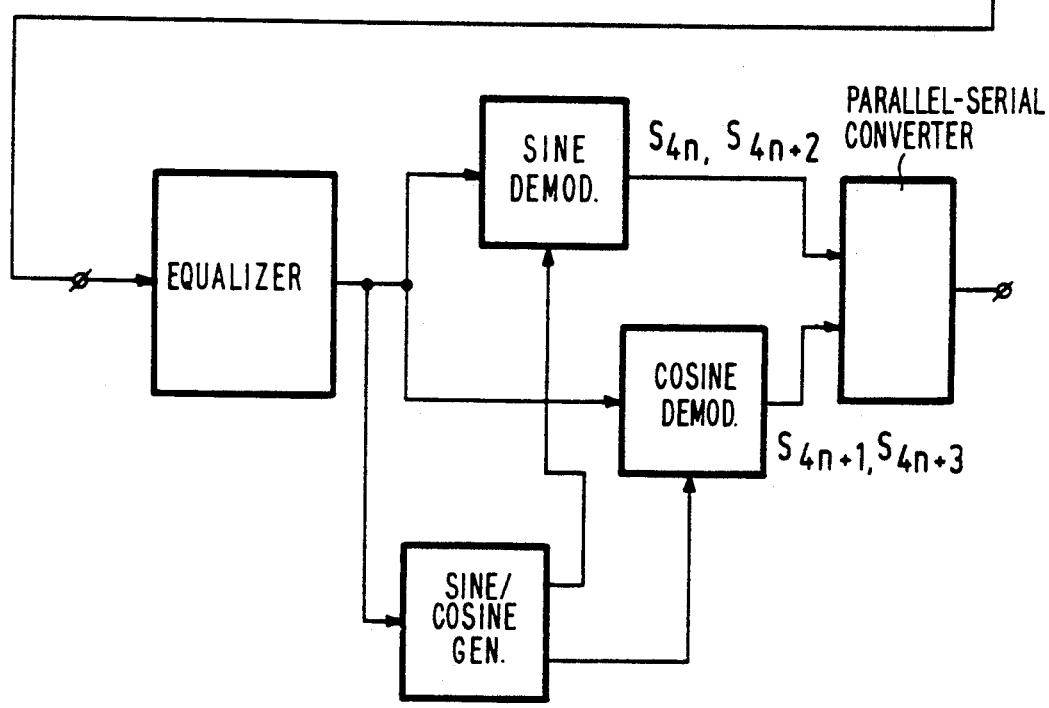
FIG. 2
PRIOR ART

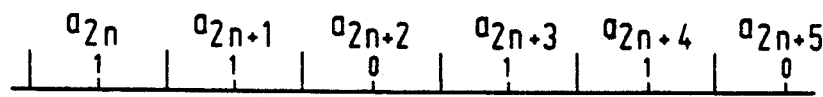
FIG.3a
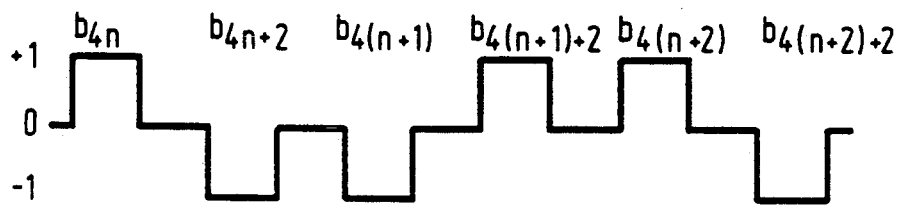
FIG.3b
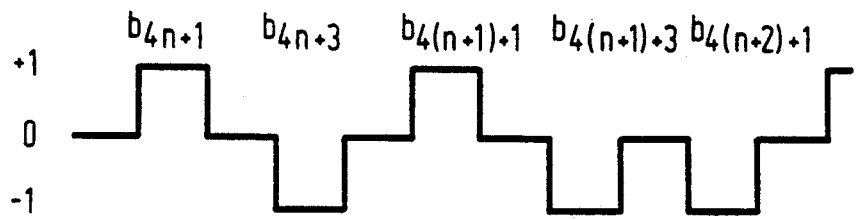
FIG.3c
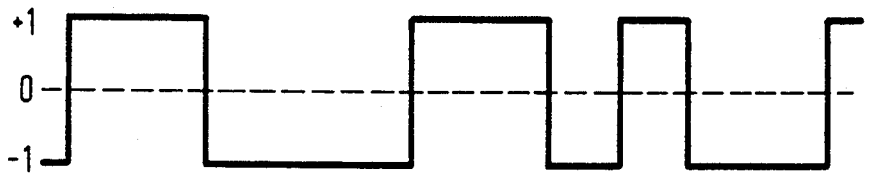
FIG.3d
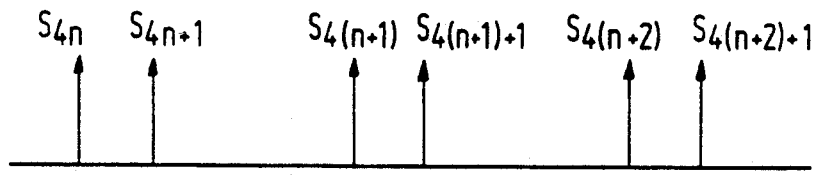
FIG.3e
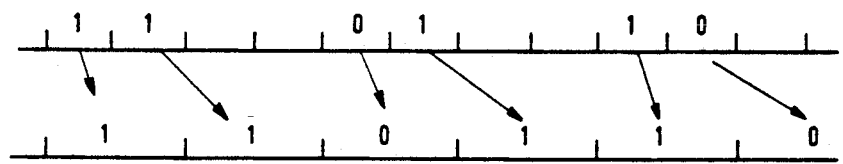
FIG.3f
FIG.3g

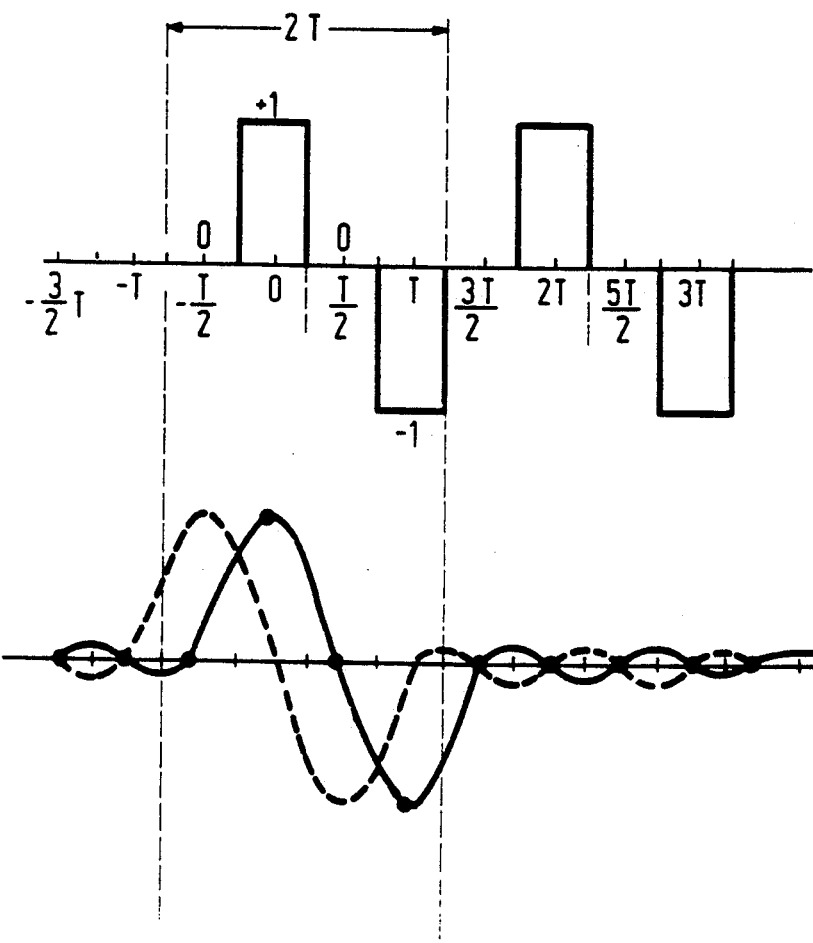
FIG. 4a
FIG. 4b
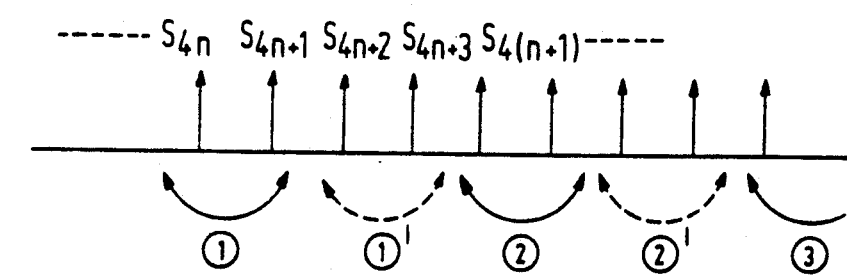
FIG. 4c

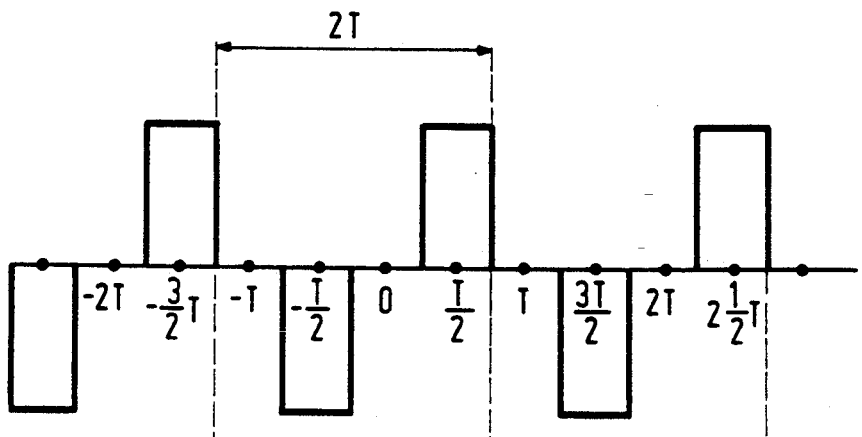
FIG.5a
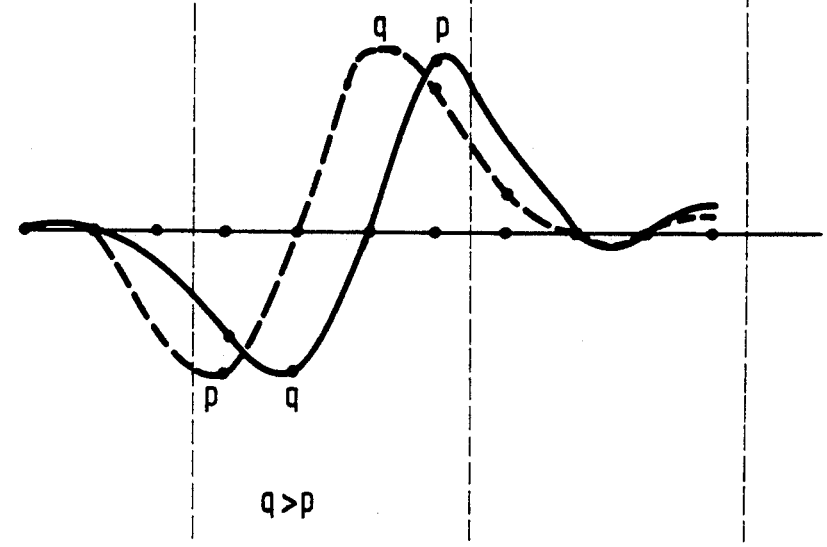
FIG.5b
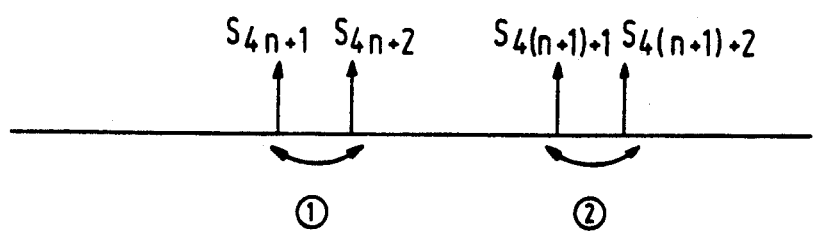
FIG.5c
FIG.5d

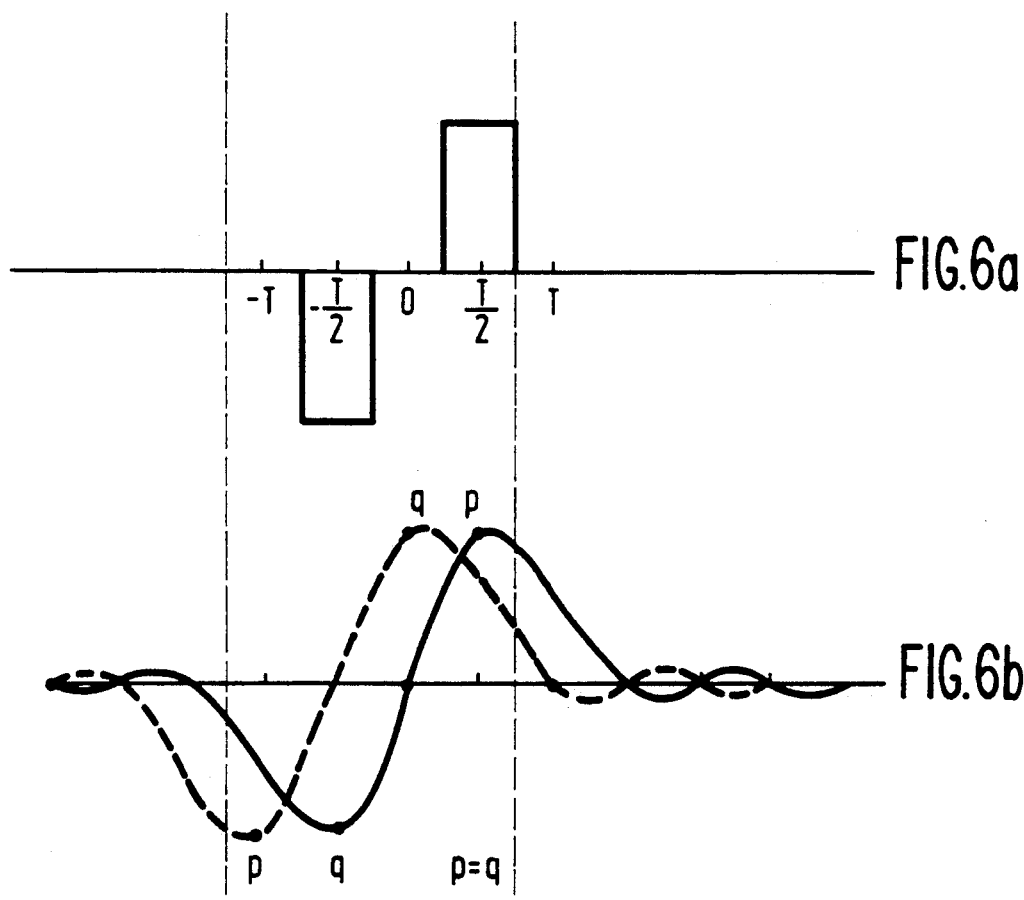

RECEIVER FOR QUADRAPHASE MODULATION SIGNALS

BACKGROUND OF THE INVENTION

1. Field of The Invention

The subject invention relates to a recorder or a signal transmission apparatus, and especially to a system of transmission and reception which is excellent in a signal-to-noise ratio.

2. Description of The Related Art

A system called a quadraphase modulation system has been proposed for transmission of digital signals. A signal subjected to quadraphase modulation has few low-frequency components, and therefore, it is suitable for the signal transmission in a system, such as a magnetic recording system and a communication system using metal wires, which does not allow low-frequency signals to pass through. This system will be summarized by using a functional block diagram of FIG. 2 and a waveform diagram of FIG. 3. It is assumed that data ..., $a_{2n}$, $a_{2n+1}$, ... are given from a signal source to an input end of a quadraphase modulation transmitter. These data are converted into parallel data of an even-number series and an odd-number series by a serial-parallel converter and modulated simultaneously by a sine modulator and a cosine modulator. When the data after modulation are denoted by ..., $b_{4n}$, $b_{4n+1}$, $b_{4n+2}$, $b_{4n+3}$, ..., the following relationships are established:

$$b_{4n} = a_{2n}$$
$$b_{4n+1} = a_{2n+1}$$
$$b_{4n+2} = -a_{2n}$$
$$b_{4n+3} = -a_{2n+1} \tag{1}$$

As is seen from these relationships, the series of even orders of $b_{4n}$, $b_{4n+2}$ are made to correspond to the series of an even order of $a_{2n}$, while the series of odd orders of $b_{4n+1}$, $b_{4n+3}$ are made to correspond to the series of an odd order of $a_{2n+1}$ independently of the above according to this quadraphase modulation system. When the series of the even and odd numbers of $a_n$ are modulated independently as shown in FIGS. 3b and 3c and then added up, accordingly, a waveform after being subjected to quadraphase modulation as shown in FIG. 3d is obtained. In this case, 0, +1, 0 and −1 covering a period of 2T together is a fundamental waveform as shown in FIG. 4a. According to this modulation system, in other words, every two bits of input data are put in a block and coded, and therefore, one period is composed of two bits. The series of FIGS. 3b and 3c have a phase difference of just 90 degrees from each other in relation to this period. Therefore, the former series is called sine modulation and the latter cosine modulation.

In a receiver of quadraphase modulation, first the deterioration in a frequency characteristic caused in the course of transmission is compensated by an equalizer of FIG. 2. Then, the data are binary-coded and the waveform in FIG. 3d is restored. Next, this binary-coded waveform is discriminated and regenerated at points of ..., $S_{4n}$, $S_{(4n+1)}$, $S_{(4n+2)}$, ... and ..., $S_{(4n+1)}$, $S_{(4n+2)+1}$, $S_{(4n+1)+2}$, ... shown in FIG. 3e, and thereby data shown in FIG. 3f are obtained. These data are further passed through a parallel-serial converter, and thereby the original data shown in FIG. 3g are regenerated. The above is the gist of the quadraphase modulation system, and further details thereof are described in IEEE Trans. on Magnetics, Vol. MAG-15, No. 6, 1465–1467, by J. A. Bixby, etc.

The fundamental waveform for cosine modulation according to the quadraphase modulation system is 0, +1, 0 and −1 covering together the period of 2T shown in FIG. 4a. This fundamental waveform needs to be subjected to waveform equalization so as not to cause an intersymbol interference to a code series which is sine-modulated and shifted by T/2 therefrom. According to the prior art, the equalization is conducted so that an impulse response of the above-mentioned fundamental waveform has such a waveform as shown in FIG. 4b. When this impulse response is denoted by Ir(t), in other words, it is given as:

$$Ir(O) = +1$$
$$Ir(-T) = -1$$
$$Ir(-nT/2) = 0 \tag{2}$$

where $n \neq 0$ and $n \neq 1$.

An equalized waveform of sine modulation in relation to a fundamental wave is obtained likewise by shifting an equalized waveform of cosine modulation by T/2 as indicated by a dotted line. By the equalization stated above, the original pulse series can be discriminated and regenerated without any intersymbol interference at any points of ..., $S_{4n}$, $S_{(4n+1)}$, $S_{(4n+2)}$, $S_{(4n+3)}$, ... as shown in FIG. 4c. For this purpose, accordingly, it is only required to select sampling points in series of ($S_{4n}$, $S_{(4n+1)}$), ($S_{(4n+1)}$, $S_{(4n+1)+1}$) and others or sampling points in series of ($S_{(4n+2)}$, $S_{(4n+3)}$), ($S_{(4n+1)+2}$, $S_{(4n+1)+3}$) by the procedures of FIG. 3e, 3f and 3g, for instance, and to discriminate and regenerate the data of each phase.

A frequency band necessary for realizing the waveform of FIG. 3b is determined by a pulse width of a fundamental waveform. Now, since the value of the width of the fundamental waveform is T/2 as shown in FIG. 4a, a Nyquist rate is 1/T. Since the pulse width of the original signal is T, on the other hand, the Nyquist rate in this case is 1/(2T). In other words, the quadraphase modulation system necessitates a transmission band twice as wide as NRZ. Noise increases as a required band widens, and this causes a disadvantage that the number of bit errors also increases.

SUMMARY OF THE INVENTION

The present invention furnishes an optimum method of equalization of a fundamental waveform of the quadraphase modulation system and thereby solves the problem of the increase in a frequency band, which is a shortcoming of this modulation system. As is seen from the equation (1), the fundamental waveform after sine modulation has the relationship of $b_{4n} = -b_{4n+2} = a_{2n}$. When either $b_{4n}$ or $b_{4n+2}$ is known, therefore, the other is determined uniquely therefrom. The same can be said with regard to cosine modulation as well. Paying attention to this respect, the present invention limits the points of discrimination of data to one point for the data series of sine modulation or cosine modulation during the period 2T (said points are two in the prior art system), and, instead, gives an impulse response which requires a smaller band than in the prior art system.

BRIEF DESCRIPTION OF THE DRAWINGS

With the above and additional objects and advantages in mind as will hereinafter appear, the invention will be described with reference to the accompanying drawings, in which:

FIG. 2 is a diagram showing a conventional example of a transmitter-receiver of a quadraphase modulation system;

FIGS. 3a–3g are waveform diagrams at each part of the quadraphase modulation system;

FIGS. 4a–4c are waveform diagrams of the quadraphase modulation system;

FIGS. 5a–5d are waveform diagrams showing examples of equalized waveforms of the quadraphase modulation system according to the present invention;

FIGS. 6a–6b is a diagram showing another example of equalized waveforms of the quadraphase modulation system according to the present invention.

DESCRIPTION OF THE PREFERRED EMBODIMENTS

FIGS. 5a–5d show examples of the impulse response meeting the above-stated conditions in regard to the fundamental waveform of 0, −1, 0 and +1 of cosine modulation. When this impulse response is given by Iw (t):

$$\begin{aligned} Iw\,(2nT) &= Iw\,((2n - 1/2)T) \quad (3)\\ &= 0\\ \text{where } n &\neq 0\\ Iw\,(-3T/2) &\neq 0\\ Iw\,(-T) &\neq 0\\ Iw\,(-T/2) &= q\\ Iw\,(0) &= 0\\ Iw\,(T/2) &= p\\ Iw\,(T) &\neq 0 \end{aligned}$$

Values p and q give the amplitudes of the impulse response at sampling points, respectively. In the case when $q > p$ herein, the impulse response for sine modulation is obtained by inverting the time base of the fundamental waveform of cosine modulation as is seen from FIGS. 5a–5d. In the case when p=q, the fundamental waveform of the cosine modulation needs only to be symmetrical with respect to points around T=0 as shown in FIG. 6, while the fundamental waveform of the sine modulation has a shape obtained by putting forward said waveform in phase by T/2.

When the equalization is so executed as to have such an impulse response as described above, the point of the time 0, i.e. the sampling point $S_{4n+2}$, is not affected by the fundamental wave of the cosine modulation indicated by a solid line as is apparent from FIGS. 5 and 6, and therefore, the data series sine-modulated at this point can be discriminated and regenerated. The data series cosine-modulated at the time −T/2, i.e. the sampling point $S_{4n+1}$, is discriminated and regenerated, likewise, without being affected by the sine-modulated data series indicated by a dotted line. As the result, the data of FIG. 5d are discriminated and regenerated.

What should be noted herein is that data of $b_{4n+1} = a_{2n+1}$ are obtained at the sampling point $S_{4n+1}$ and data of $b_{4n+2} = -a_{2n}$ at the sampling point $S_{4n+2}$. That is, the sequence of the regenerated data reverses. Consideration needs to be given to this respect with regard to a regenerating circuit.

While an interval between zero cross points of the prior-art impulse response given by the equation (2) is T, an interval between zero cross points of the impulse response of the equation (3) is 1.5 T, and thus it is widened by about 1.5 times or above, at least. Herein, the interval between zero cross points means a time interval between a zero point at the time 0 of the impulse response and a zero point nearest to said point. As described above, the system of equalization according to the present invention can reduce a band necessary for transmission of the quadraphase modulation waveform to about ⅔ of that according to the prior-art system.

Figure 1:
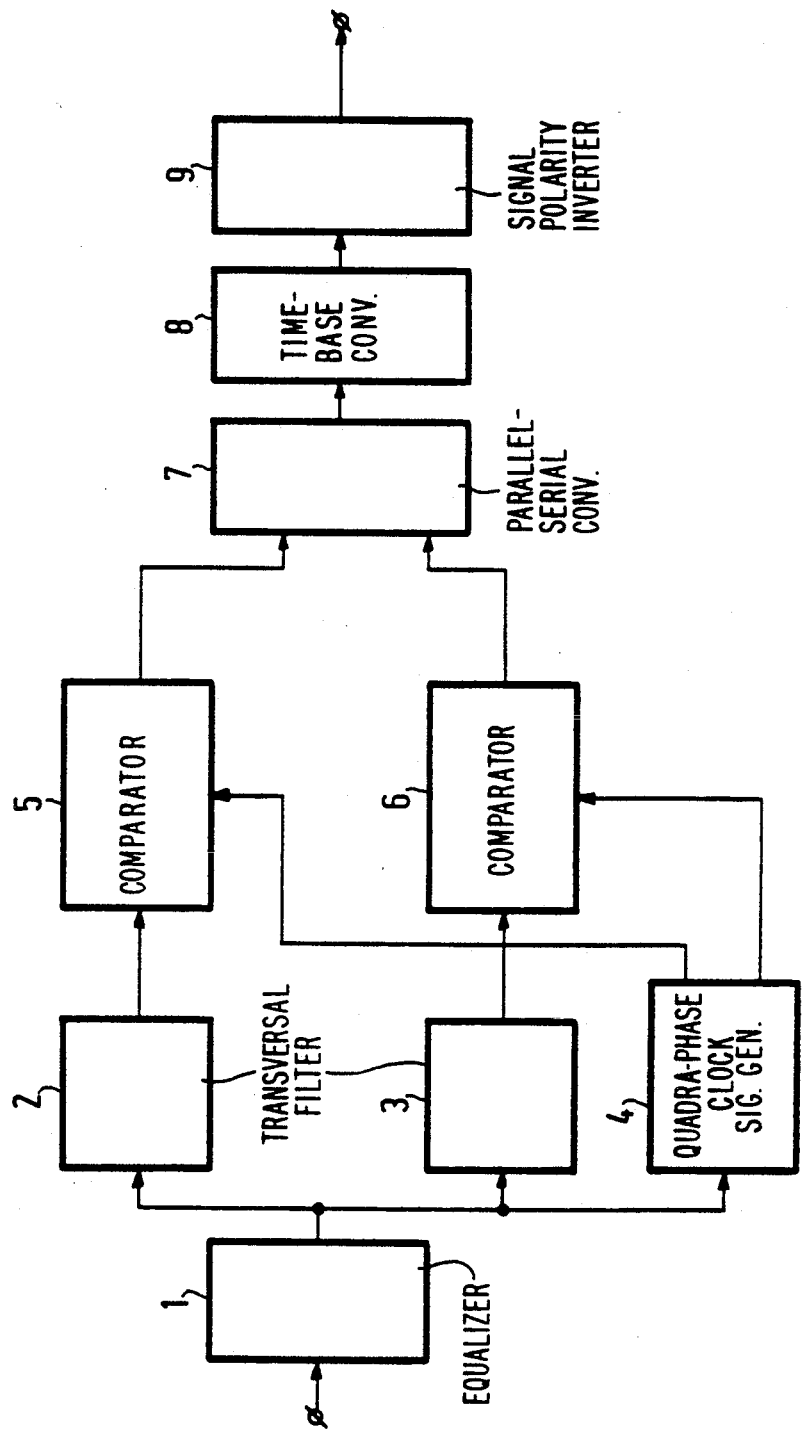
FIG. 1 is a diagram showing a construction of a receiver for quadraphase modulation which is one embodiment of the present invention.

The present invention will be described in detail with reference to FIG. 1. Transmitted data are equalized first by an equalizer 1 according to the prior-art system shown in FIG. 4, and the data thus equalized are divided into three and supplied to a transversal filter 2, a transversal filter 3 and a quadraphase clock signal generator 4. In the transversal filters 2 and 3, it is only required to convert the waveforms shown in FIG. 4b into those shown in FIG. 5b. This can be realized basically by deteriorating the high-frequency characteristic of the waveforms of FIG. 4b and further by giving phase distortion thereto. In other words, the coefficients of the transversal filters 2 and 3 may be given as the impulse response of the frequency characteristic obtained as the result of dividing the frequency characteristic of the impulse responses of the fundamental waveforms of FIG. 4b by the frequency characteristic of the impulse response of the fundamental waveform of FIG. 5b. This method is well known generally. What should be noted herein is that the coefficients of the transversal filters 2 and 3 are different naturally from each other because of a difference in the impulse response between the fundamental wave of cosine modulation and that of sine modulation as shown in FIG. 5b and therefore, two kinds of filters need to be employed separately. Next, outputs of these filters are binary-coded at prescribed sampling points by comparators 5 and 6, respectively, and supplied to a parallel-serial converter 7. In the output of this converter, data are given in the sequence of ..., $a_{2n+1}$, $-a_{2n}$ in every two bits as shown previously, and so the time base is reversed. This time base is inverted by a time base converter 8. As the result, the data are regenerated in the right sequence of ..., $-a_{2n}$, $a_{2n+1}$, .... However, the polarity of the signal is inverted, and therefore, it is inverted again two bits apart by a signal polarity inverter 9. The original data series is restored correctly by the above processes.

Figure 7:
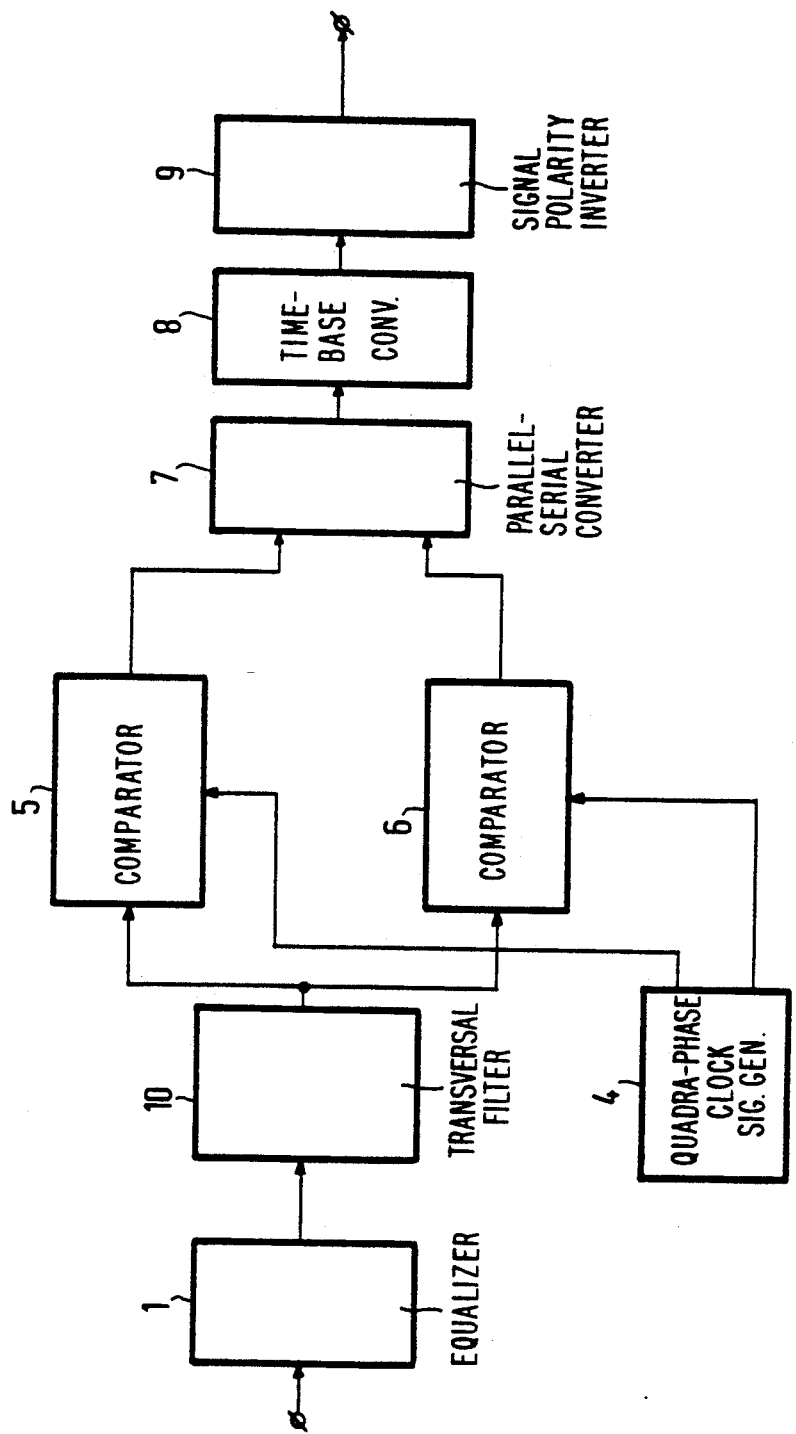
FIG. 7 is a diagram showing another example of construction of a receiver for quadraphase modulation according to the present invention.

Besides, the coefficients of the transversal filters 2 and 3 turn identical in the symmetrical impulse responses shown in FIG. 6. Therefore, a circuit having necessary characteristics can be constructed only by using one filter 10 as shown in FIG. 7.

According to the present invention, as described above, the quadraphase modulation waveform can be demodulated in a transmission band of about ⅔ of a conventional one, and so data demodulation can be implemented with an excellent SN ratio. As the result, data communication accompanied by small transmission error and having high reliability can be attained.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

We claim:

1. An information transmission system for transferring quadraphase modulated data signals from a source to a destination, comprising a quadraphase modulation transmitter, a channel, and a quadraphase modulation receiver, the transmitter being provided with quadraphase modulation means for converting even and odd data symbols into a stream of even and odd quadraphase channel symbols which are transmissible from the transmitter to the receiver via the channel, the receiver being provided with equalizing means for equalizing the channel symbols and discrimination means for taking decisions with respect to the equalized channel symbols, characterized in that the equalizing means are arranged for producing output pulses having a bandwidth smaller than the data symbol rate and in that symbol decisions taken by the discrimination means are reversed in time with respect to the order in which the data symbols were originally generated.

2. An information transmission system for transferring quadraphase modulated data signals from a source to a destination, comprising a quadraphase modulation transmitter, a channel, and a quadraphase modulation receiver, the transmitter being provided with quadraphase modulation means for converting even and odd data symbols into a stream of even and odd quadraphase channel symbols which are transmissible for the transmitter to the receiver via the channel, the receiver being provided with equalizing means for equalizing the channel symbols, and discrimination mean for taking decisions with respect to the channel symbols, characterized in that the equalizing means comprises two equalizers in a parallel arrangement, said two equalizers being coupled to two separate detectors forming the discrimination means, one of said two separate detectors taking symbol decisions with respect to the even channel symbols, and the other of said two separate detectors taking symbol decisions with respect to the odd channel symbols.

3. An information transmission system according to claim 1, wherein the receiver comprises a time-base converter for reversing in time the order of the even and odd symbol decisions.

4. An information transmission system according to claim 3, wherein the receiver comprises a signal polarity inverter for inverting the polarity of either the even or the odd symbol decisions.

5. An information transmission system according to claim 2, wherein the receiver comprises a time-base converter for reversing in time the order of the even and odd symbol decisions.

6. An information transmission system according to claim 5, wherein the receiver comprises a signal polarity inverter for inverting the polarity of either the even or the odd symbol decisions.

7. A receiver for receiving quadraphase modulated data signals, wherein said quadraphase modulated data signals comprise even and odd data symbols converted into a stream of even and odd quadraphase channel symbols, said receiver being provided with equalizing means for equalizing the channel symbols and discrimination means for taking decisions with respect to the equalized channel symbols, characterized in that the equalizing means are arranged for producing output pulses having a bandwidth smaller than the data symbol rate and in that symbol decisions taken by the discrimination means are reversed in time with respect to the order in which the data symbols were originally generated.

8. A receiver for receiving quadraphase modulated data signals, wherein said quadraphase modulated data signals comprise even and odd data symbols converted into a stream of even and odd quadraphase channel symbols, said receiver being provided with equalizing means for equalizing the channel symbols and discrimination means for taking decisions with respect to the equalized channel symbols, characterized in that the equalizing means comprises two equalizers in a parallel arrangement, said two equalizers being coupled to two separate detectors forming the discrimination means, one of said two separate detectors taking symbol decisions with respect to the even channel symbols, and the other of said two separate detectors taking symbol decisions with respect to the odd channel symbols.

9. A receiver according to claim 7, wherein the receiver further comprises a time-base converter for reversing in time the order of the even and odd symbol decisions.

10. A receiver according to claim 9, wherein the receiver further comprises a signal polarity inverter for inverting the polarity of either the even or the odd symbol decisions.

11. A receiver according to claim 8, wherein the receiver further comprises a time-base converter for reversing in time the order of the even and odd symbol decisions.

12. A receiver according to claim 11, wherein the receiver further comprises a signal polarity inverter for inverting the polarity of either the even or the odd symbol decisions.

13. An equalizer arrangement for use in a receiver of quadraphase modulation signals, wherein said quadraphase modulated data signals comprise even and odd data symbols converted into a stream of even and odd quadraphase channel symbols, said equalizer arrangement equalizing the channel symbols, characterized in that the equalizer arrangement is arranged for producing output pulses having a bandwidth smaller than the data symbol rate.

* * * * *